(12) United States Patent
AlDeghaishem

(10) Patent No.: US 9,022,787 B2
(45) Date of Patent: May 5, 2015

(54) EDUCATIONAL GAME FOR TEACHING ADDITION AND SUBTRACTION OF WHOLE NUMBERS

(76) Inventor: Dunia Tariq AlDeghaishem, Al-Qusour (KW)

( * ) Notice: Subject to any disclaimer, the term of this patent is extended or adjusted under 35 U.S.C. 154(b) by 477 days.

(21) Appl. No.: 12/706,865

(22) Filed: Feb. 17, 2010

(65) Prior Publication Data

US 2011/0200975 A1    Aug. 18, 2011

(51) Int. Cl.
*G09B 19/22* (2006.01)
*G09B 19/02* (2006.01)
*A63F 3/04* (2006.01)
*A63F 3/00* (2006.01)

(52) U.S. Cl.
CPC ............... *G09B 19/02* (2013.01); *A63F 3/0415* (2013.01); *A63F 2003/00318* (2013.01); *A63F 2003/00946* (2013.01); *A63F 2250/162* (2013.01)

(58) Field of Classification Search
CPC ......... G09B 19/02; G09B 23/00; G09B 23/02
USPC .......................................... 434/188, 191, 128
See application file for complete search history.

(56) References Cited

U.S. PATENT DOCUMENTS

| | | | |
|---|---|---|---|
| 4,497,487 A * | 2/1985 | Crippen | 273/146 |
| 4,548,585 A | 10/1985 | Kelly | |
| 5,334,026 A | 8/1994 | Ylitalo | |
| 5,529,497 A | 6/1996 | Bigold | |
| 5,820,381 A | 10/1998 | Dreyfous | |
| 6,926,530 B2 | 8/2005 | Frieman | |
| 7,182,342 B1 | 2/2007 | Fulton, Jr. | |
| 2003/0178772 A1* | 9/2003 | Gan | 273/273 |

* cited by examiner

*Primary Examiner* — Kesha Frisby
(74) *Attorney, Agent, or Firm* — Lowe Hauptman & Ham, LLP

(57) ABSTRACT

An educational game for teaching addition and subtraction of whole numbers includes a carpet/game board including ten positively numbered spaces from +1 to +10 inclusive a 0 space and negatively numbered spaces from −1 to −10 inclusive and wherein said positive numbered spaces proceed upwardly in a generally zigzag direction from 0 to plus 10 and the negatively numbered spaces proceed downwardly from 0 to minus 10 and an extra space above the plus 10 and an extra space below the minus 10 wherein the extra space above the plus 10 is a win space and the space below the minus 10 is a lose space. The game also includes a single cube shaped die having six faces with an indication of plus 2, minus 2 and no movement on three of the faces and a plus 1, minus 1 and plus 1 plus and additional turn on the sixth face. Further, the game includes six game pieces of separate distinct colors.

1 Claim, 3 Drawing Sheets a - Starting point
b - Positive figures area
c - Negative figures area
d - Winners players area
e - Losers players area

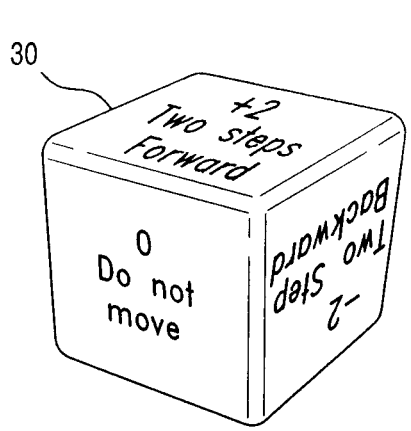
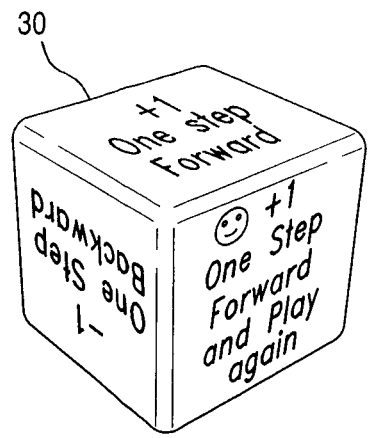
FIG. 2a  FIG. 2b
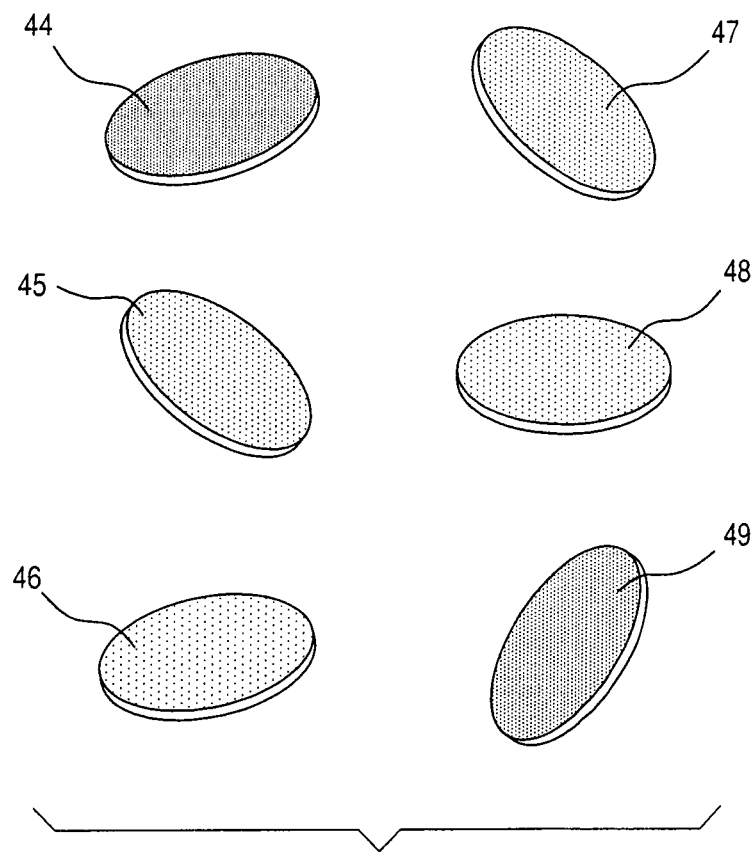
FIG. 3

EDUCATIONAL GAME FOR TEACHING ADDITION AND SUBTRACTION OF WHOLE NUMBERS

FIELD OF THE INVENTION

This invention relates to a game for teaching addition and subtraction of whole numbers and more particularly to an educational game that includes a carpet with positive and negative numbered spaces with an overall length of about two meters by about 60 cm wide with a zero space as well as a plus one to plus ten positive spaces and minus one to minus ten negative numbered spaces.

BACKGROUND FOR THE INVENTION

Apparatus for teaching the addition and subtraction of whole numbers through the use of objects are known. For example a U.S. Pat. No. 5,529,497 of Bigold. As disclosed, the apparatus includes a sheet with three containers across in a row, the containers being separated by a mathematical sign (a plus sign or a minus sign), and the second and third containers being separated by an equal sign, and a plurality of objects of similar shape but with distinctive markings. Some of the objects are placed in the first container, and others in the second container. The third container may then be filled by a child with the object representing the result of the mathematical process to be performed.

A more recent approach to a teaching apparatus and method for visually representing mathematical expressions is disclosed in a U.S. patent of Dreyfous, U.S. Pat. No. 5,820,381. As disclosed, an apparatus and method for teaching mathematical expressions includes a plurality of four-sided members that represent the variables of factors of a mathematical expression. Each four sided member has a different area representing a different variable in the mathematical expression. The apparatus enables a math student to visualize the rules that apply to mathematical expressions. The four-sided members include a first side having a first color, a second side having a second color different from the first color wherein the first side represents a positive number and the second side represents a negative number. Alternatively, the sign may distinguished by varying surface roughness of the members. The four sided members can be used for teaching by illustrating simple multiplication and division, multiplication, division and factorization of polynomials, linear expressions including equations including inequations and absolute value, and systems of linear equations.

A more recent approach to teaching addition and subtraction of positive and negative numbers by a game is disclosed in a U.S. patent of Frieman, U.S. Pat. No. 6,926,530. The patent disclosure is based in the Null Theory of Addition and Subtraction Positive and Negative Numbers. The apparatus comprises (a) a plurality of positive units, (b) a plurality of negative units, (c) a demarcated playing zone, and (d) a means for measuring the number of free positive units and free negative units within the demarcated playing zone. While the demarcated playing zone, free positive units combine with free negative units zone to form null units with each null unit comprising an equal number of positive units and an equal number of negative units. Each null unit preferably comprises one positive unit and one negative unit.

A more recent approach to teaching addition and subtraction of positive and negative numbers by a game is disclosed in a U.S. patent of Fulton, Jr., U.S. Pat. No. 7,182,342. The patent discloses a game for teaching arithmetic skills involves having a play spin a wheel twice, the first time determines the arithmetic operation to be performed and the first number in the second spin determines the second number. The player then moves his or her game piece according to the results of the arithmetic operation, if the player correctly performs the operation and obtains the correct result. The player will forfeit his turn if he incorrectly performs the operation. Rules of the game control the direction of movement of the game pieces and the number of spaces the game piece can be moved on any one turn. A winner is determined by the first player to reach a finish position.

Notwithstanding the above, it is presently believed that there is a need and a potential commercial market for an improved game for teaching addition and subtraction of whole numbers.

BRIEF SUMMARY OF THE INVENTION

In essence the present invention contemplates an educational game for teaching addition and subtraction of whole numbers. As contemplated the game includes and/or consist of a carpet/game board including positively numbered spaces from plus one to plus ten inclusive, a zero space and negatively numbered spaces from minus one to minus ten inclusive and wherein each positively numbered space proceeds upwardly in a generally zigzag direction from zero to plus ten and said negatively numbered spaces proceed downwardly from zero to minus ten on the carpet.

A single cube shaped die having six spaces and wherein a first of said faces indicates a positive move of two spaces a second of said six faces indicates a move of two steps backward and a third of said faces indicates no movement. A fourth of the faces indicates a positive move of one space forward while a fifth of the faces include one step backward and a sixth face indicates a forward space with one step forward and plus another turn.

The invention will now be described in connection with the following figures wherein like reference numerals have been used to indicate like parts.

DESCRIPTION OF THE DRAWINGS

FIG. 2*a* is a perspective view of a die i.e. a cube shaped element with different messages on each of the six faces but only three faces shown in FIG. 2*a*;

FIG. 2*b* is a perspective view of a die i.e. a cube with three different messages shown on the other three faces; and FIG. 3 is a perspective view of six colored game pieces with each game piece of a distinctive color for use by up to six players of the game in accordance with a preferred embodiment of the invention.

DESCRIPTION OF THE PREFERRED EMBODIMENTS OF THE INVENTION

An educational game in accordance with the present invention is a competitive and entertaining game for children and adults. The goal is to simplify the concept of the positive and negative numbers in an exciting presentation. Thus, the game is designed in a unique manner and is composed of a game board or carpet having the game spaces indicated thereon in various colors. A die and six playing disc with different colors allows from two to six players to play the game with the winner being the one who reaches the field above the positive ten and the loser is anyone who reaches the field below the negative ten. By throwing the die the players will determine their progress or regress in the game. Initially the players each roll the die and the player with the highest number begins the game. It should be recognized that playing is a children's way to learn and discover the world around them. Consequently the educational game disclosed herein is designed to teach children some of the concepts of mathematics in an interesting way and develop their minds by teaching them through skills and positive habits. Through this game the player will live an exciting adventure that is represented by drawings and pictures and must finish the game to reach the specific goal of the adventure. To finish this adventure the player must follow some steps and instructions that will teach them some of the concepts of the positive and negative numbers. The game is also fun for children and adults and is a family game appropriate for all ages.

Figure 1:
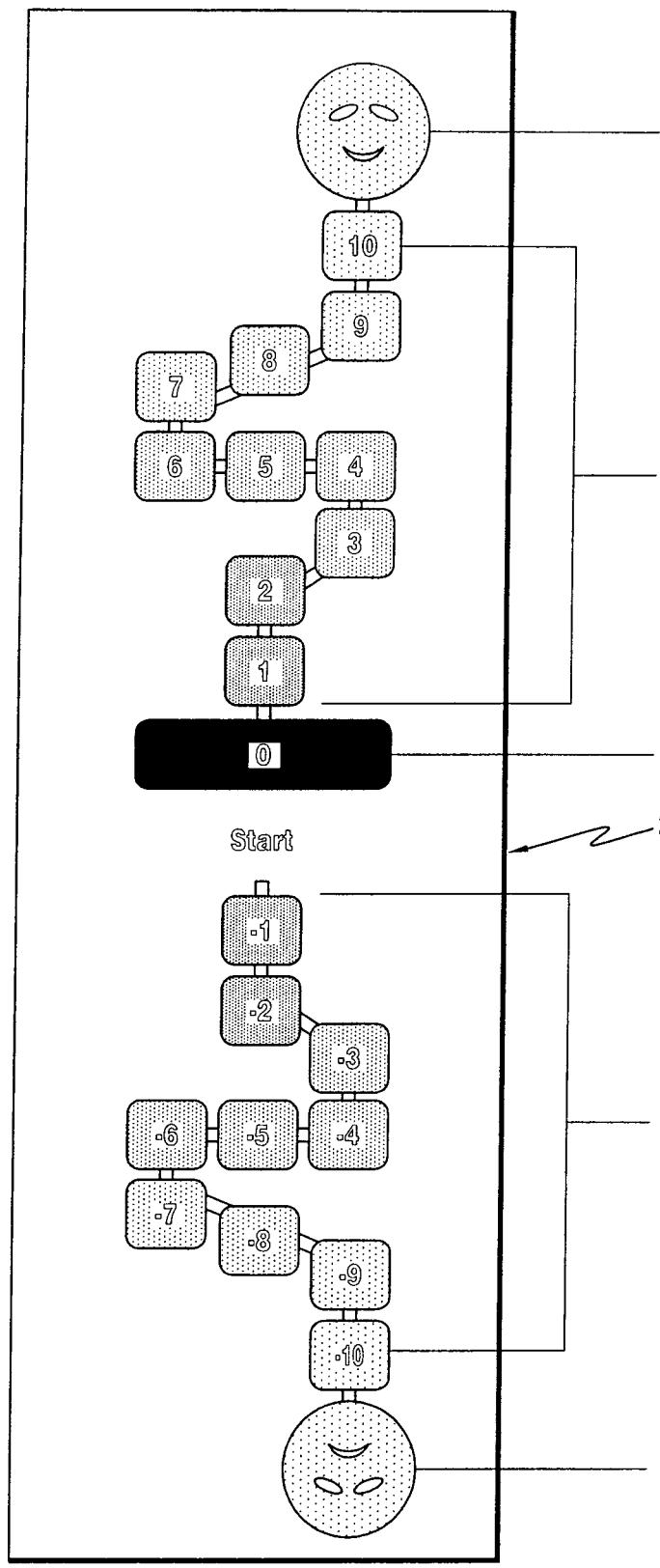
FIG. 1 is a top or plane view of a carpet/game board in accordance with a preferred embodiment of the invention.

As shown in FIG. 1, a soft carpet/game board 20 has a length of about two liters and a width of about 60 cm. The carpet 20 includes a plurality of positive spaces and a plurality of negative spaces each which have a length and width about 20 cm by 20 cm and indicia printed on the carpet. For example the positive spaces include ten numbered spaces bearing number plus one to plus ten inclusive and a winner goal that is one space beyond the plus ten space.

The positive spaces plus 1 to plus 10 inclusive proceed upwardly above a zero (0) space that has dimensions of about 20×40 cm which is the start position for each player in the game and ascending zigzag pattern of positive spaces numbers plus a plus one space and plus two space that are disposed on a vertical line emanating from the center of the zero (0) space. The third positive space is to the right and slightly above the plus two space while the number plus four space is directly above the plus three space as illustrated. The number five space and number six space are located on a horizontal line to the left of the number four space. The plus seven space is directly above the number plus six space while spaces plus eight and plus nine are to the right of spaces plus seven and plus eight respectively. The space plus ten is directly above the plus nine space and the ultimate goal is directly above the plus ten space and might be marked by a "happy face."

The negative spaces minus one to minus ten proceed downwardly in a zigzag pattern below the zero (0) space as follows. For example, the minus one and minus two spaces are disposed along a vertical line directly below one another. A third or minus three space is then located to the right and below the minus two space with the minus four space directly below the minus three space. The minus five and minus six spaces are disposed on a generally horizontal line with the minus four space and to the left of the minus four space. The minus seven space is directly below the minus six space while the minus eight and minus nine spaces are angled downwardly below and to the right of the minus seven space. The minus ten space is directly below the minus nine space and a "you lose" space is directly below the minus ten space.

The colors of the spaces are also varied. For example, in a preferred embodiment of the invention the zero (0) space is black while the plus one and plus two as well as the minus one and minus two spaces are light green. The plus three, plus four, plus five and plus six spaces are light blue while the plus seven and plus eight spaces are dark blue. The plus nine space is lavender while the ten space is brown and the happy space for the winner is yellow/green.

FIGS. 2a and 2b show the six spaces of the relatively large die that is made of cloth stuffed with cotton and has a 20 cm×20 cm dimensions. The six spaces each include one of the following instructions: +2, two steps forward, −2, two steps back and a third space do not move. The fourth phase includes an indication +1, one step forward, −1, one step backward and plus 1 one step forward and play again. FIG. 3 shows six game pieces of different colors with one piece for each player. The colors are red, green, lavender, yellow, blue and brown or other pre-selected colors.

Figure 4:
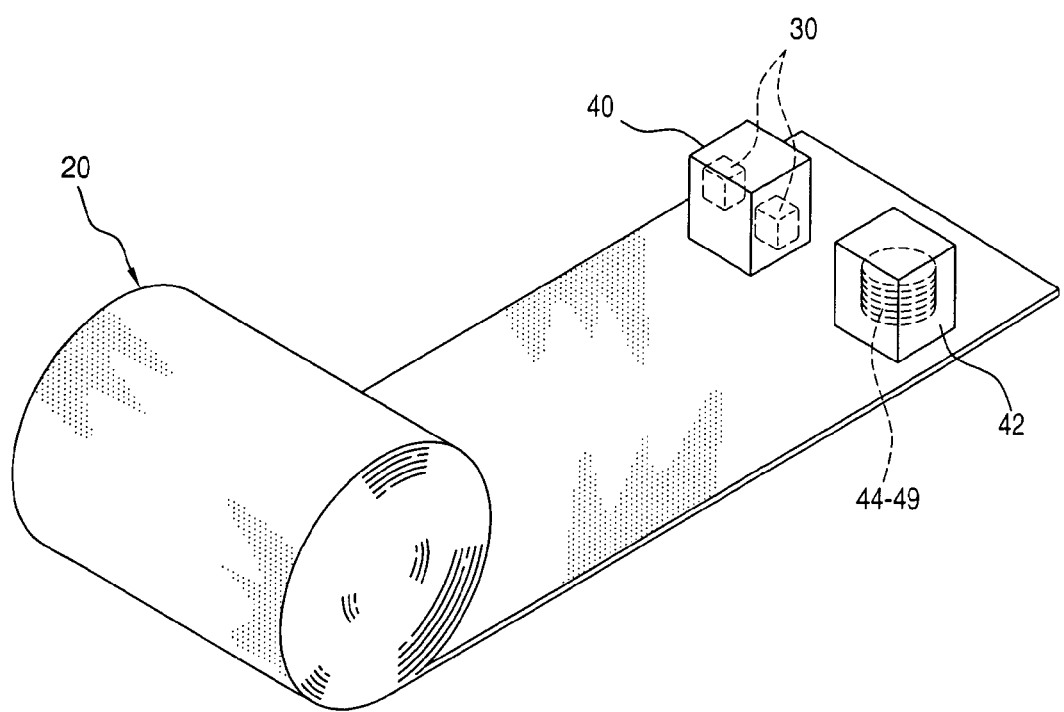
FIG. 4 is a perspective view of the rear portion of the carpet game partially rolled into a transport position and showing a die holder and pocket for game pieces.

FIG. 4 shows a carpet 20 in a partially rolled up position with a container 40 for storing the die 30 and a container 42 for storing the game pieces 44-49 inclusive. The game pieces or disc have a diameter of about 10 cm and a thickness of about 1 cm.

There are several goals that make this game interesting and enjoyable. For example:
  The game is enjoyable, competitive for adults and children;
  Useful for the player activity and movement through movement from one stage to another;
  Player's simplify the concept with positive and negative numbers submitted to children in age from six years and older in a theatrical and practical way;
  The child will know and discover the positive numbers at early ages;
  The child will recognize the positive and negative numbers and know what positive (+) and negative (−) marks mean;
  The child will know what zero (0) means;
  Through the graphics of the game an adventure the player will live to reach a goal, the child's mind will imagine and live this adventure, the development and the capacity of imagination is very important for such children in this age group;
  The child will train to have a goal in life and to be ambitious as in the game adventure the goal must be reached in order to achieve winning; and
  The child will train on participation and social activity where the game requires more than one player (at least two).

In addition the game is considered safe and suitable for children and is easily carried or stored because the carpet can be pleated or rolled up to have a pocket that can hold the die and game pieces. Also, the materials that make the dice and disc make them safe and easy to carry and play with. In addition the game components are large since children love things that are large and have more visible details making it safe whereas the children cannot swallow these parts. Finally, the design of the carpet is suitable to put in homes where children can sit and practice their hobbies and games and have fun to where the carpets are made of water resistant, easy to clean and non-slip surfaces. Finally, the game can be manufactured in different sizes to be suitable for most places whether large or small.

It is also contemplated that the aforementioned game can be programmed into a computer and then played as a computer game using a computer.

While the invention has been described in connection with its preferred embodiment it should be recognized that changes and modifications may be made therein without departing from the scope of appended claims.

What is claimed is:

1. An educational game for teaching addition and subtraction of whole numbers, said game consisting of:
  a soft carpet having game spaces indicated thereon, a length of 2 meters and a width of 60 cm and including 10 positively numbered spaces from +1 to +10 inclusive, a 0 space and 10 negatively numbered spaces from −1 to −10 inclusive and wherein said positively numbered spaces proceed upwardly in a zigzag direction from +1 to +10 each of said spaces having a dimension of 20 cm×20 cm, said 10 negatively numbered spaces proceeding downwardly in a zigzag direction from −1 to −10 inclusive and are separated from said positive numbered spaced by the 0 space with dimensions of 20 cm×40 cm;

a single cube shaped die having six faces and wherein a first of said faces include a positive movement of two spaces, a second of said six faces indicating a move of −2 steps backward, and a third face indicating no movement, a fourth face indicating a movement of +1 space forward, a fifth face indicating one space back and a sixth face indicating one step forward plus another turn and wherein said die is made of cloth stuffed with cotton and said die having dimensions of 20 cm$^3$;

a first container for storing said single cube shaped die;

six game pieces of six distinctive colors with a red, orange, yellow, green, light blue and dark blue game piece, and a second container for storing said six game pieces therein, wherein the positive spaces plus 1 to plus 10 inclusive proceed upwardly above the zero (0) space which is the start position for each player in the game and ascending zigzag pattern of positive spaces numbers plus a plus one space and plus two space that are disposed on a vertical line emanating from the center of the zero (0) space; the third positive space is to the right and slightly above the plus two space while the number plus four space is directly above the plus three space; the number five space and number six space are located on a horizontal line to the left of the number four space; the plus seven space is directly above the number plus six space while spaces plus eight and plus nine are to the right of spaces plus seven and plus eight respectively; the space plus ten is directly above the plus nine space and the ultimate goal is directly above the plus ten space; the negative spaces minus one to minus ten proceed downwardly in a zigzag pattern below the zero (0) space as follows; for example, the minus one and minus two spaces are disposed along a vertical line directly below one another; a third or minus three space is located to the right and below the minus two space with the minus four space directly below the minus three space; the minus five and minus six spaces are disposed on a generally horizontal line with the minus four space and to the left of the minus four space; the minus seven space is directly below the minus six space while the minus eight and minus nine spaces are angled downwardly below and to the right of the minus seven space; the minus ten space is directly below the minus nine space and a "you lose" space is directly below the minus ten space.

\* \* \* \* \*